United States Patent
Yang et al.

(10) Patent No.: US 11,510,358 B2
(45) Date of Patent: Nov. 29, 2022

(54) FLEXIBLE RECIPROCATING LINEAR SEEDLING SEPARATING DEVICE FOR A POT SEEDLING TRANSPLANTER

(71) Applicant: JIANGSU UNIVERSITY, Jiangsu (CN)

(72) Inventors: Qizhi Yang, Jiangsu (CN); Xinyi Shi, Jiangsu (CN); Ibrar Ahamd, Jiangsu (CN); Wen Li, Jiangsu (CN); Jianping Hu, Jiangsu (CN); Li Xu, Jiangsu (CN)

(73) Assignee: Jiangsu University, Jiangsu (CN)

( * ) Notice: Subject to any disclaimer, the term of this patent is extended or adjusted under 35 U.S.C. 154(b) by 1038 days.

(21) Appl. No.: 16/304,949

(22) PCT Filed: Sep. 8, 2017

(86) PCT No.: PCT/CN2017/100969
§ 371 (c)(1),
(2) Date: Nov. 27, 2018

(87) PCT Pub. No.: WO2019/006850
PCT Pub. Date: Jan. 10, 2019

(65) Prior Publication Data
US 2021/0219486 A1 Jul. 22, 2021

(30) Foreign Application Priority Data
Jul. 5, 2017 (CN) .......................... 201710540960.0

(51) Int. Cl.
*A01C 11/02* (2006.01)
*A01G 9/029* (2018.01)

(52) U.S. Cl.
CPC ............ *A01C 11/02* (2013.01); *A01G 9/0299* (2018.02)

(58) Field of Classification Search
CPC ..... A01C 11/02; A01C 11/025; A01G 9/0299; A01G 9/086; A01G 9/088; A01G 9/029
See application file for complete search history.

(56) References Cited

U.S. PATENT DOCUMENTS 5,215,550 A * 6/1993 Tesch, Jr. ............. A01C 11/025
111/104
2015/0342112 A1 * 12/2015 Buell .................... A01C 11/025
111/105

FOREIGN PATENT DOCUMENTS

CN 202374682 U 8/2012
CN 104798513 A 7/2015
(Continued)

*Primary Examiner* — Kristen C Hayes
(74) *Attorney, Agent, or Firm* — Jenkins, Wilson, Taylor & Hunt, P.A.

(57) ABSTRACT

The present invention provides a flexible reciprocating linear seedling separating device for a pot seedling transplanter, including a frame, a seedling cup opening and closing device, a linear transmission device, a seedling cup moving device, several seedling cups and a control system. A flexible linear transmission device is fixed on the frame, a seedling cup moving device is fixed on the flexible linear transmission device, and a seedling cup opening and closing device is fixed on the seedling cup moving device. Several seedling cups are fixed on the seedling cup moving device. The control system is respectively electrically connected with a motor of the linear transmission device and a cylinder of the seedling cup opening and closing device. The control system controls the motor to drive flexible linear transmission device to move seedling cup moving device, thereby driving the seedling cups to reach a designated position and receive the pot seedlings. The control system controls opening and closing of the seedling cups through a seedling cup opening and closing device and drop the pot seedlings onto the designated falling point. The seedling separating device (Continued)

of the present invention has simple structure, controllable procedure and high reliability; through flexible transmission, the movement is smooth, which can greatly reduce the noise and vibration. The motor drives the seedlings cups to move left and right in a straight line; the cylinder pushes the cups to open and close; the seedling cup is vertically downward, the seedling falling posture is better.

8 Claims, 4 Drawing Sheets

(56) References Cited

FOREIGN PATENT DOCUMENTS

| | | |
|---|---|---|
| CN | 106233900 A | 12/2016 |
| CN | 106385896 A | 2/2017 |
| JP | 2004194553 A | 7/2004 |

\* cited by examiner

FLEXIBLE RECIPROCATING LINEAR SEEDLING SEPARATING DEVICE FOR A POT SEEDLING TRANSPLANTER

TECHNICAL FIELD

The present invention belongs to the field of automated transplanting in agricultural, and more particularly to a flexible reciprocating linear seedling separating device for a pot seedling transplanter.

BACKGROUND ART

At present, mechanized transplanting has been greatly developed. There are a great variety of transplanters with diverse functions, but most of them are general-purpose transplanters. It is difficult to widely apply the general-purpose transplanters to various types of vegetable fields in China due to the difference of sizes and physical characteristics among various vegetable seedlings and different planting requirements such as row spacing, plant spacing, and the number of rows planted in the same ridge. There are many repetitive labors from the nursery of plug seedlings to transplant of plug seedlings, and manual continuous work easily makes people tired, resulting in seedling missing and other problems. Whether high speed automation of the transplanting of the plug can be achieved is particularly critical.

Seedling separating device is a key link in the field of automated transplanting. If the seedlings are directly taken out of the plug and placed in the planter by the seedling picking device, this process will be unreliable, because the positional relationship between the seedling picking position and the planter, and the relationship between the seedling picking time and the planter's movement state should be considered. Therefore, a seedling separating device is required to properly allocate the seedlings that are quickly taken, which accurately receives the seedlings from the seedling picking device, and then accurately throws the seedlings into the planting device. Seedling separating device generally adopts rigid transmission, and has poor movement stability, because large vibration will affect the accuracy of seedling separating.

Contents of the Invention

The object of the present invention is to provide a flexible reciprocating linear seedling separating device for a pot seedling transplanter directed to the above problem, the seedling separating device is a flexible reciprocating linear seedling separating device for a pot seedling transplanter based on a synchronous belt (toothed belt) transmission. The device adopts synchronous belt (toothed belt) for flexible transmission and reciprocating linear motion. The flexible synchronous belt can damp impact and absorb vibration, so the device has small vibration impact and moves steadily and reliably. The device can achieve accurate seedling matching at the designated position, and achieve the seedling separating action of separating seedlings into two rows and dropping seedlings from the lower mouth of the seedling cups.

The technical solution of the present invention is: a flexible reciprocating linear seedling separating device for a pot seedling transplanter, including a frame, a seedling cup opening and closing device, a flexible linear transmission device, a seedling cup moving device, several seedling cups and a control system;

A flexible linear transmission device is fixed on the frame, the flexible linear transmission device includes a driven shaft, a driven synchronous wheel, a flexible synchronous belt (toothed belt), a first toothed sliding block, a second toothed sliding block, a motor, a coupling, a tension wheel, a driving synchronous wheel, a driving shaft and a tension wheel shaft; the synchronous belt is installed in the groove of the frame, and both ends of the synchronous belt are respectively connected with the driving synchronous wheel and the driven synchronous wheel; the driving synchronous wheel is sleeved on the driving shaft, the driving shaft is mounted on one end of the frame through a bearing, and the motor is connected to one end of the driving shaft through the coupling; the driven synchronous wheel is sleeved on the driven shaft, and the driven shaft is mounted on the other end of the frame through a bearing; the first toothed sliding block and the second toothed sliding block are in close contact with the synchronous belt through toothed mesh, and are connected with the seedling cup moving device; the tension wheel is sleeved on the tension wheel shaft and is closely attached to the synchronous belt; the two ends of the tension wheel shaft are respectively connected with two sides of the frame;

A seedling cup opening and closing device is mounted on the seedling cup moving device, and several seedling cups are fixed on the seedling cup moving device;

The control system is respectively electrically connected with the motor and the seedling cup opening and closing device; the control system controls the motor to drive flexible linear transmission device to move the seedling cup moving device, so as to drive the seedling cup to receive the pot seedling at a designated position. The control system controls the opening and closing of the seedling cup through a seedling cup opening and closing device to drop the pot seedling onto the designated falling point;

In the above solution, the other end of the driving shaft passes through, from front to back and in sequence, the first circular end cap, the second small retaining ring, the second large retaining ring, the second bearing, the driving synchronous wheel, the first small retaining ring, the first bearing, the first large retaining ring and the third circular end cap;

The second bearing and the first bearing are respectively installed in the slots on the left and right sides of one end of the frame; the second square gland has a slot at the lower end; the second square gland presses on the first bearing and is fixed on the frame; the first large retaining ring is placed in the slot; the first small retaining ring is placed in the slot provided at one end of the driving shaft;

The third square gland has a slot at its lower end; the third square gland presses on the second bearing and is fixed on the frame; the second large retaining ring is placed in the slot, and the second small retaining ring is placed in the slot provided at the other end of the driving shaft.

In the above solution, the bearings at both ends of the driven shaft are respectively installed in the slots on the left and right sides of the other end of the frame;

The lower ends of the first square gland and the fourth square gland respectively have a slot at their lower end and respectively press on bearings on both ends of the driven shaft; the first square gland and the fourth square gland are fixed on the frame.

In the above solution, the first square gland, the second square gland, the third square gland and the fourth square gland are respectively fixed on the frame by screws.

In the above solution, one end of the tension wheel shaft is connected with the upper end of the first Z type connector through the first double-head stud, and the lower end of the first Z type connector is fixed on one side of the frame by screws;

The other end of the tension wheel shaft is connected with the upper end of the second Z type connector through the second double-head stud, and the lower end of the second Z type connector is fixed on the other side of the frame by screws;

The first double-head stud is located at an upper portion of the first Z type connector. The second double-head stud is located at an upper portion of the second Z type connector. The first and second double-head studs are respectively sleeved with a spring washer and tightened by a nut. In the above solution, the seedling cup moving device includes a seedling cup connection frame, a linear sliding block and a linear guide rail;

One end of the seedling cup connection frame has an U-shape with one opening toward the horizontal side, and the other end of it is a vertical plate. The U-shaped end of the seedling cup connection frame is fixed on the first toothed sliding block and the second toothed sliding block that are in toothed mesh with the synchronous belt through bolts;

The linear sliding block slides on the linear guide rail through the inner groove, and the linear guide rail is fixed on the frame through bolts. The middle of the vertical plate end of the seedling cup connection frame is fixed on the linear sliding block by screws.

In the above solution, the seedling cup includes a seedling cup body, a connecting rod, a first hinge, a second hinge, and a spring;

The seedling cup body is fixed on the seedling cup connection frame by bolts;

The lower end of the first hinge is fixedly connected with the upper end of the leaflet on one side of the opening of the seedling cup body, and the lower end of the second hinge is fixedly connected with the upper end of the leaflet on the other side of the opening of the seedling cup body; the first hinge and the second hinge are respectively rotatably connected with the seedling cup body;

The two ends of the connecting rod are respectively fixed on one end of the first hinge and the second hinge by bolts, so as to ensure that the opening of the lower end of the seedling cup body can be opened when the seedling cup moves; the two sides of the spring are respectively fixed at the other end of the first hinge and the second hinge, so as to ensure that the opening of the seedling cup body is closed when the seedling cup is still.

In the above solution, the seedling cup opening and closing device includes a cylinder connector, a cylinder and a brake wire;

The cylinder is fixed on the cylinder connector, and the cylinder connector is fixed on the U-shaped end of the seedling cup connection frame;

One end of the brake wire is fixed on the second hinge by its own wire winding characteristic; the other end of the brake wire is fixed on the extension shaft of the cylinder by its own wire winding characteristics; the movement of the cylinder pulls and relaxes the brake wire to realize the opening and closing of the seedling cup.

Compared with the prior art, the beneficial effects of the present invention are:

1. The seedling separating device of the present invention has simple structure, controllable procedure and high precision; the seedling cup is vertically downward and has a good seedling falling posture. Adopting flexible transmission can greatly reduce the noise and vibration.

2. The flexible linear transmission device of the present invention combines a motor, a synchronous wheel, a synchronous belt, and a toothed sliding block together through a frame, and has a compact and simple structure. The seedling cup connecting frame in the seedling cup moving device is fixed together with the toothed sliding block which has been in toothed mesh with the synchronous belt in the flexible linear transmission device through bolts. Synchronous belts can move flexibly, reducing noise and absorbing vibration.

3. The seedling cup opening and closing device of the present invention comprises a cylinder connector, a cylinder, and a brake wire, wherein, one end of the brake wire is connected to the cylinder extension shaft, and the other end of the brake wire is fastened on the hinge of the seedling cup. The cylinder functions to pull and relax the brake line, and the brake line directly drives the seedling cup hinge to move up and down, so as to achieve the opening and closing action of the seedling cup. The structure is simple and it responds quickly.

4. The component combined by the seedling cup, the seedling cup moving device and the seedling cup opening and closing device realizes seedling falling at fixed time and point from the seedling cups. The seedling falling posture is better. The objective of seedling falling at fixed time and point is realized.

In the figure: 1—frame, 2—seedling cup opening and closing device, 3—flexible linear transmission device, 4—seedling cup moving device, 5—seedling cups, 6—a first square gland, 7—driven shaft, 8—driven synchronous wheel, 9—synchronous belt, 10—a first toothed sliding block, 11—a second toothed sliding block, 12—a first Z type connector, 13—motor, 14—coupling, 15—a first double-head stud, 16—a second square gland, 17—a first small retaining ring, 18—tension wheel, 19—driving synchronous wheel, 20—driving shaft, 21—the third square gland, 22—a first circular end cap, 23—a second Z type connector, 24—a second double-head stud, 25—tension wheel shaft, 26—a second circular end cap, 27—a fourth square gland, 28—spring washer, 29—a first bearing, 30—a first large retaining ring, 31—a third circular end cap, 32—a second small retaining ring, 33—a second bearing, 34—a second large retaining ring, 35—seedling cup connecting frame, 36—linear sliding block, 37—linear guide rail, 38—seedling cup body, 39—connecting rod, 40—a first hinge, 41—a second hinge, 42—spring, 43—cylinder, 44—cylinder connector, 45—brake line.

EMBODIMENTS

The present invention will now be further described in detail with reference to the accompanying drawings and embodiments, but the scope of the present invention is not limited to this.

Figure 1:
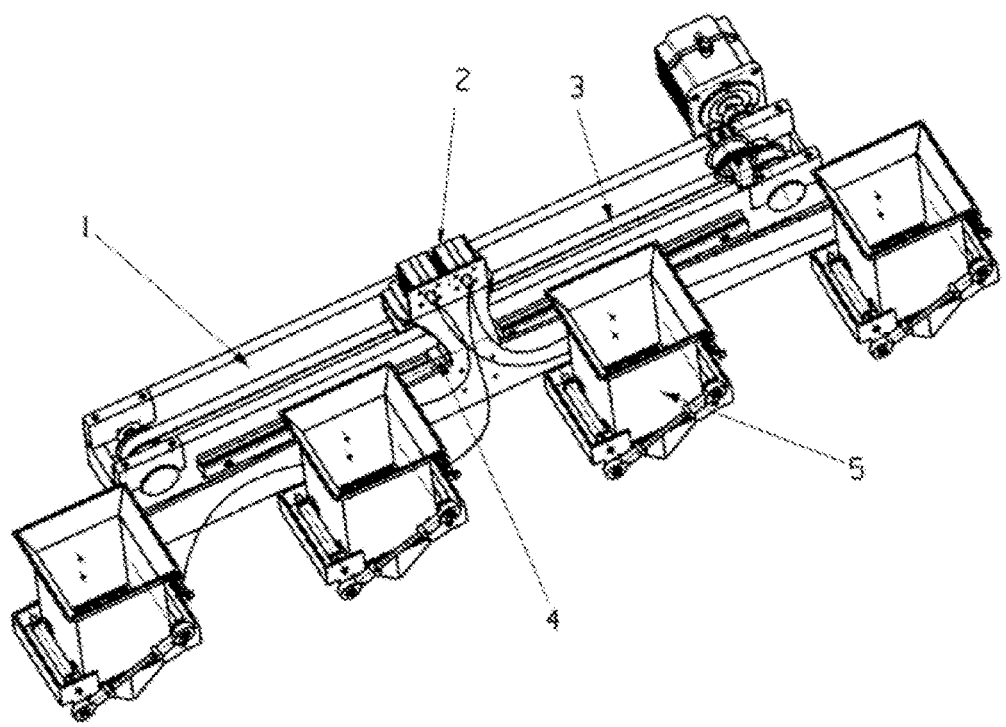
FIG. 1 is a schematic structural view of a transplanter seedling separating device according to the present invention.
Figure 2:
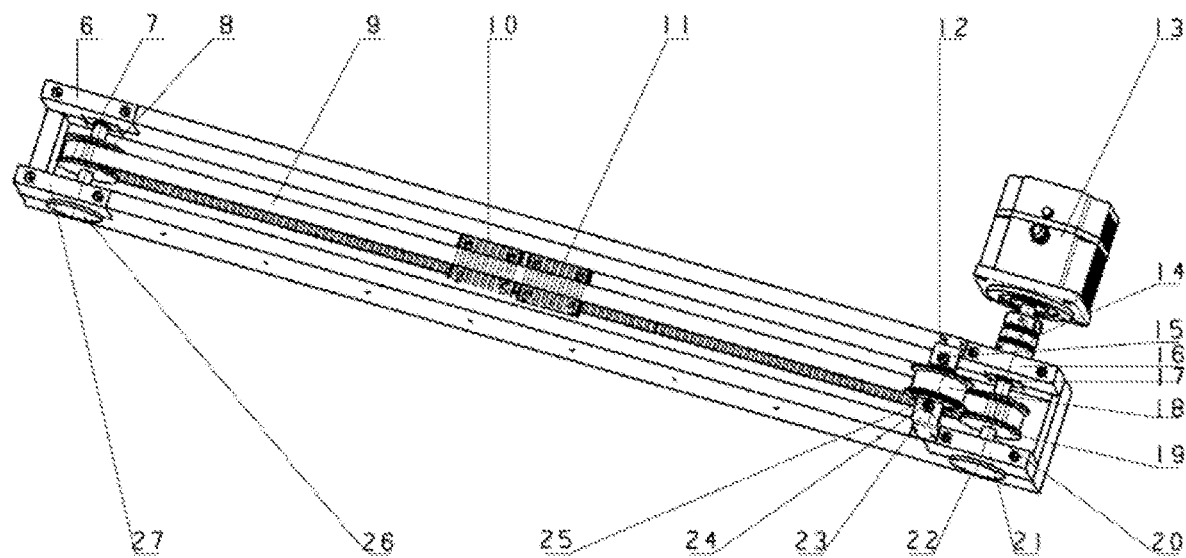
FIG. 2 is a schematic structural view of a linear transmission device according to the present invention.
Figure 3:
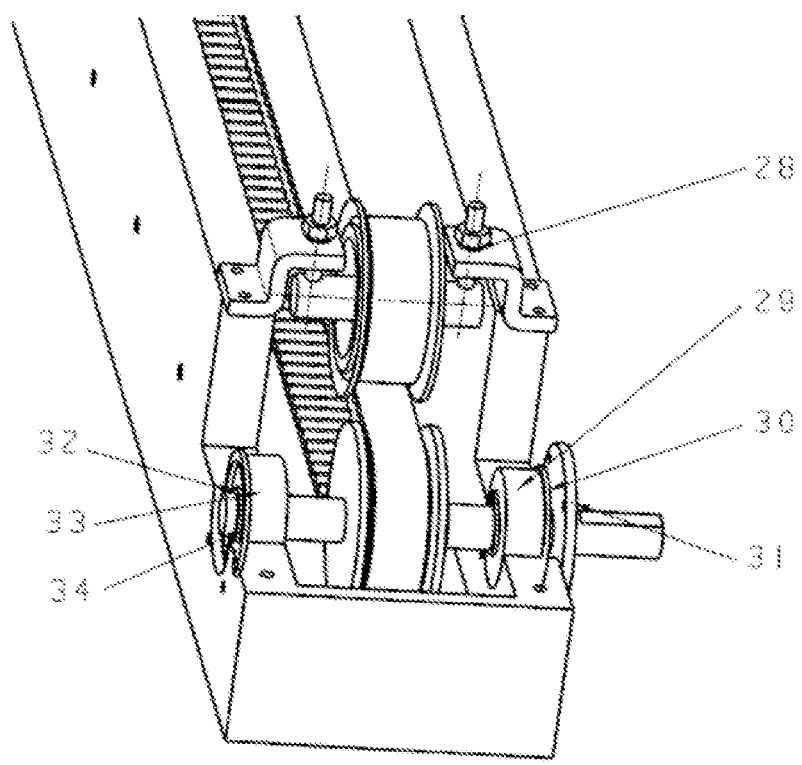
FIG. 3 is a supplementary schematic structural view of the linear transmission device of the present invention.

FIG. 1 shows an embodiment of a flexible reciprocating linear seedling separating device for a pot seedling transplanter according to the present invention. The flexible reciprocating linear seedling separating device for a pot seedling transplanter comprises a frame 1, a seedling cup opening and closing device 2, a flexible linear transmission device 3, a seedling cup moving device 4, several seedling cups 5 and a control system. A flexible linear transmission device 3 and a seedling cup moving device 4 are fixed on the frame 1, a seedling cup moving device 4 is fixed on the flexible linear transmission device 3, and a seedling cup opening and closing device 2 is fixed on the seedling cup moving device 4. Several seedling cups 5 are fixed on the seedling cup moving device 4. The flexible linear transmission device 3 drives the seedling cup 5 to a designated position to receive the pot seedlings captured by the seedling dropping claws. The control system is respectively electrically connected with a motor 13 of the flexible linear transmission device 3 and a cylinder 43 of the seedling cup opening and closing device 2; the control system controls the motor 13 to drive flexible linear transmission device 3 to move seedling cup moving device 4, thereby driving the seedling cups 5 to reach a designated position and receive the pot seedlings. The control system controls opening and closing of the seedling cups 5 through a seedling cup opening and closing device 2 and drop the pot seedlings onto the designated falling point;

As shown in FIGS. 2 and 3, the flexible linear transmission device 3 includes a first square gland 6, a driven shaft 7, a driven synchronous wheel 8, a synchronous belt 9, a first toothed sliding block 10, a second toothed sliding block 11, a first Z type connector 12, a motor 13, a coupling 14, a first double-head stud 15, a second square gland 16, a first small retaining ring 17, a tension wheel 18, a driving synchronous wheel 19, a driving shaft 20, a third square gland 21, a first circular end cap 22, a second Z type connector 23, a second double-head stud 24, a tension wheel shaft 25, a second circular end cap 26, a fourth square gland 27, a spring washer 28, a first bearing 29, a first large retaining ring 30, a third circular end cap 31, a second small retaining ring 32, a second bearing 33, a second large retaining ring 34.

The motor 13 is connected to one end of the driving shaft 20 through the coupling 14, the other end of the driving shaft 20 passes through, from front to back and in sequence, the first circular end cap 22, the second small retaining ring 32, the second large retaining ring 34, the second bearing 33, the driving synchronous wheel 19, the first small retaining ring 17, the first bearing 29, the first large retaining ring 30 and the third circular end cap 31, and is fixed on the frame 1 through the second square gland 16 and the third square gland 21.

The driven shaft 7 is sleeved with the driven synchronous wheel 8, and is fixed on the frame 1 through the first square gland 6 and the fourth square gland 27. The first toothed sliding block 10 and the second toothed sliding block 11 are in close contact with the synchronous belt 9 through toothed mesh and are fixed on the seedling cup connecting frame 35 by bolts.

The tension wheel shaft 25 is sleeved with the tension wheel 18, connected with the upper end of the first Z type connector 12 through the first double-head stud 15 and connected with the upper end of the second Z type connector 23 through the second double-head stud 24. The lower ends of the first Z type connector 12 and the second Z type connector 23 are respectively fixed on both sides of the frame 1 by screws. The first double-headed stud 15 is located at an upper portion of the first Z type connector 12, the second double-headed stud 24 is located at an upper portion of the second Z type connector 23, the first double-headed stud 15 and the second double-headed stud 24 are respectively sleeved with a spring washer 28 and tightened by a nut. The tension wheel 18 controls the tension of the synchronous belt 9 through the positive and negative rotation of the nut.

The second bearing 33 and the first bearing 29 are respectively installed in the slots on the left and right sides of one end of the frame 1; the second square gland 16 has a slot at the lower end; the second square gland 16 presses on the first bearing 29 and is fixed on the frame 1; the first large retaining ring 30 is placed in the slot; the first small retaining ring 17 is placed in the slot provided at one end of the driving shaft 20. One side of the first bearing 29 is blocked by the first large retaining ring 30 and the other side of it is blocked by the first small retaining ring 17. The first bearing 29 is fixed on the frame 1 by the second square gland 16.

The third square gland 21 has a slot at its lower end; the third square gland 21 presses on the second bearing 33 and is fixed on the frame 1; the second large retaining ring 34 is placed in the slot, and the second small retaining ring 32 is placed in the slot provided at the other end of the driving shaft 20. One side of the second bearing 33 is blocked by the second large retaining ring 34 and the other side of it is blocked by the second small retaining ring 32. The second bearing 33 is fixed on the frame 1 by the third square gland 21. The first square gland 6, the second square gland 16, the third square gland 21 and the fourth square gland 27 are respectively fixed on the frame 1 by screws.

Figure 4:
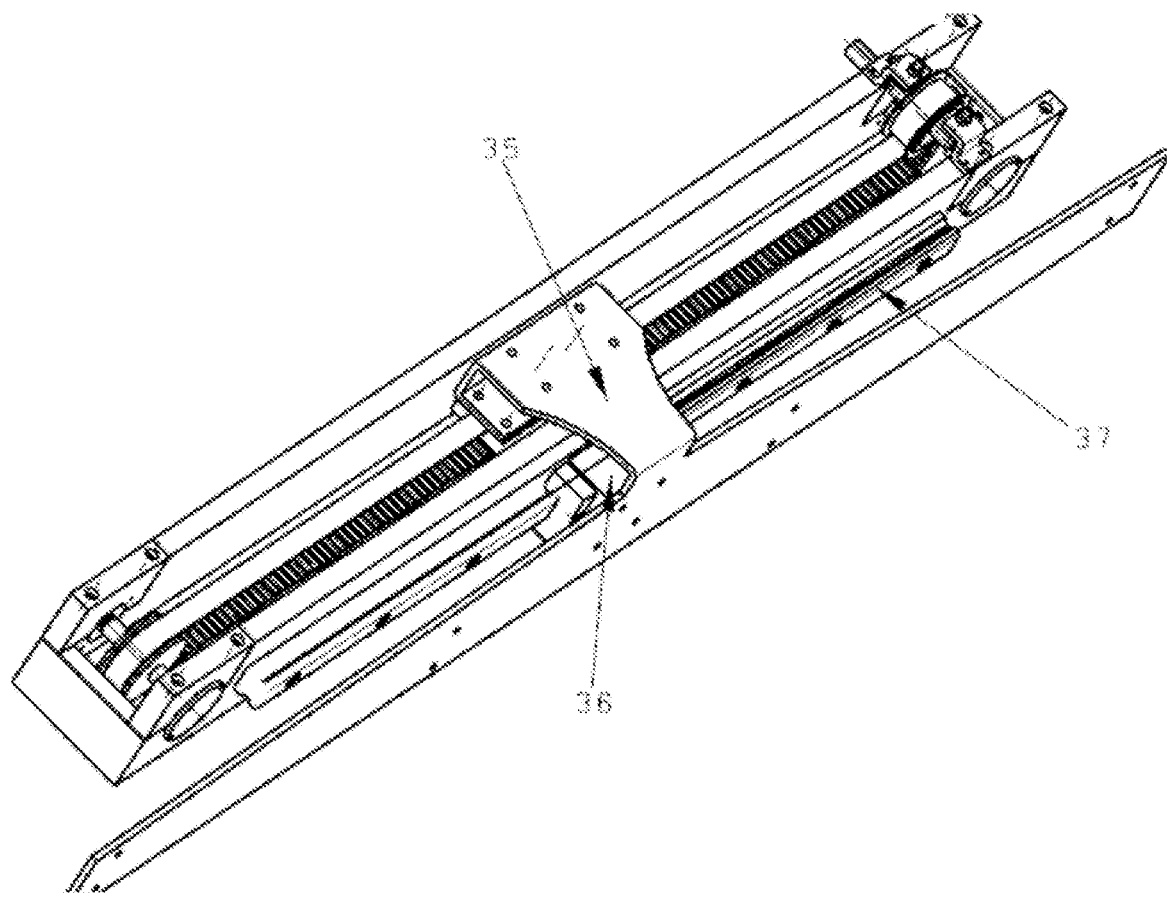
FIG. 4 is a schematic structural view of a seedling cup moving device according to the present invention.

As shown in FIG. 4, the seedling cup moving device 4 includes a seedling cup connecting frame 35, a linear sliding block 36 and a linear guide rail 37. One end of the seedling cup connecting frame 35 is an U-shape with an opening toward the horizontal side, and the other end of it is a vertical plate. The U-shaped end of the seedling cup connecting frame 35 is fixed through bolts on the first toothed sliding block 10 and the second toothed sliding block 11 that are in toothed mesh with the synchronous belt 9. The linear sliding block 36 slides on the linear guide rail 37 through the inner groove, and the linear guide rail 37 is fixed on the frame 1 through bolts. The middle of the vertical plate end of the seedling cup connecting frame 35 is fixed on the linear sliding block 36 by screws.

Figure 5:
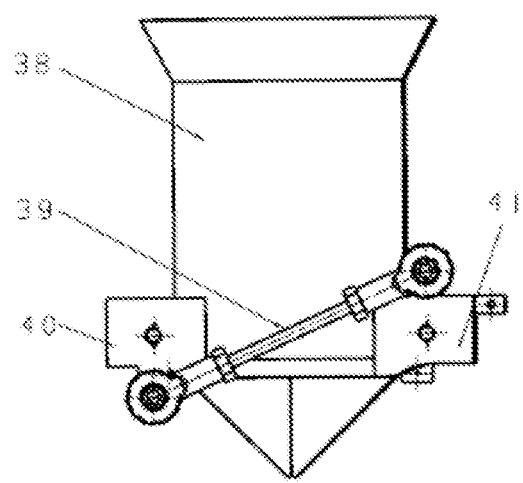
FIG. 5 is a left side view of a seedling cup according to the present invention.
Figure 6:
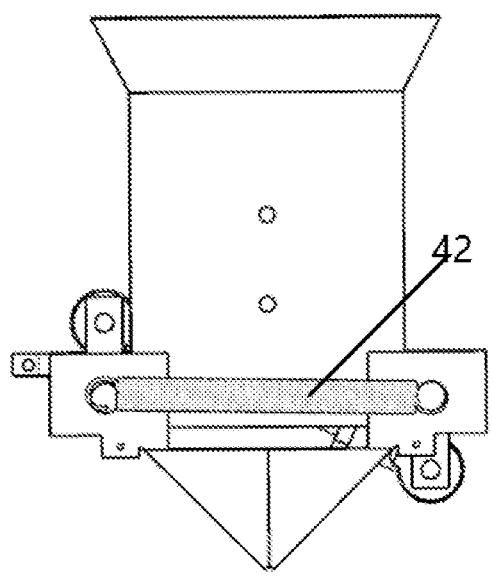
FIG. 6 is a right side view of a seedling cup according to the present invention.

As shown in FIGS. 5 and 6, the seedling cup body 38 of seedling cup 5 is fixed on the seedling cup connecting frame 35 by bolts; There are four seedling cups 5 in this example. The seedling cup 5 includes a seed cup body 38, a connecting rod 39, a first hinge 40, a second hinge 41, and a spring 42. The first hinge 40 and the second hinge 41 are respectively rotatably connected with the seedling cup body 38 to fix two sides. The two ends of the connecting rod 39 are respectively fixed on the first hinge 40 and the second hinge 41 by bolts, so as to ensure that the seedling cup can be opened when it moves; the two sides of the spring 42 are respectively fixed on the first hinge 40 and the second hinge 41, so as to ensure the seedling cup is closed when it is still.

Figure 7:
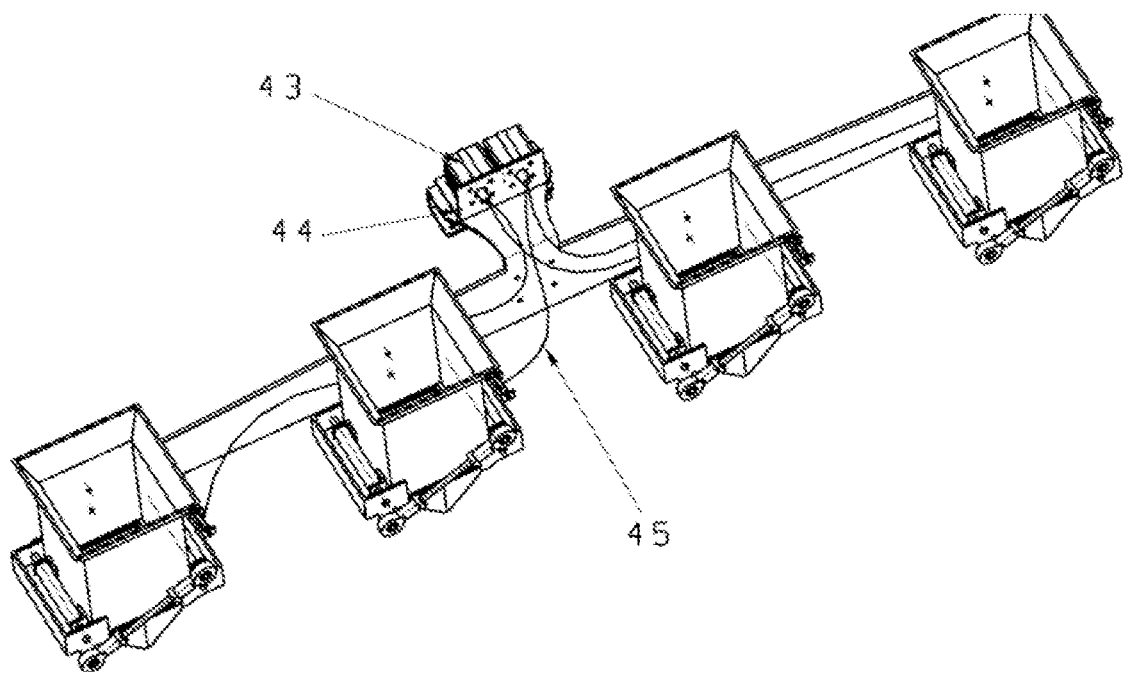
FIG. 7 is a schematic structural view of a seedling cup opening and closing device according to the present invention.

As shown in FIG. 7, the seedling cup opening and closing device 2 includes a cylinder connector 44, a cylinder 43 and a brake wire 45. The cylinder 43 is fixed on the cylinder connector 44 by screws, and the cylinder connector 44 is fixed on the seedling cup connecting frame 35 by bolts. One end of the brake wire 45 is fixed on the second hinge 41 by its own wire winding characteristic; the other end of the brake wire 45 is fixed on the extension shaft of the cylinder 43 by its own wire winding characteristics; the movement of the cylinder 43 pulls and relaxes the brake wire 45 to realize the opening and closing of the seedling cup.

The working principle of the invention:

By inputting power to the motor 13, the motor 13 turns the driving synchronous wheel 19, and the driving synchronous wheel 19 drives the synchronous belt 9 to move. The synchronous belt 9 drives the first toothed sliding block 10 and the second toothed sliding block 11 to move left and right. The first toothed sliding block 10 and the second toothed sliding block 11 drive the seedling cup connecting frame 35 to move left and right, and finally the seedling cup connecting frame 35 drives the seedling cups 5 to move left and right. As shown in FIG. 1, the seedlings are loaded into the four seedling cups 5 shown in the figure. When the seedling cups 5 move with the seedlings to the designated falling point, the motor 13 stops rotating, and the cylinder 43 pushes the seedling cup opening and closing device 2 so that the lower openings of the first seedling cup 5 and the third seedling cup 5 are opened to drop the seedlings; then the motor 13 continues to rotate, the second seedling cup 5 and the fourth seedling cup 5 are driven to the designated falling point and then stop rotating, and the air cylinder 43 pulls the brake wire 45 to push the seedling cup 5 to open and drop the seedling. When the falling of seedlings of four seedling cups is completed, the cylinder 43 relaxes the brake wire 45 so that the seedling cups 5 are closed. After that, the motor 13 reversely rotate to drive the seedling cup 5 back to reload the seedling. In this way, the purpose of seedling separating device for allocating seedlings in seedling cups is achieved.

The control system in this example includes a programming computer, a touch screen, a PLC controller, and a servo motor driving system. The programming computer is used for writing and downloading of program instructions; the touch screen controller is used for sending control instruction to seedling separating device and on-line monitoring of running status; the PLC controller controls the forward and reverse rotation of the motor 13 and the extension and retraction of the extension shaft of the cylinder 43; the servo motor driving system receives control commands from the PLC controller and is used to drive the relevant mechanical loads.

It should be understood that although the present specification has been described in terms of various examples, not every example includes only one independent technical solution. This description of the specification is only for the sake of clarity. Those skilled in the art should refer to the specification as a whole, and the technical solutions in the various examples may be suitably combined to form other embodiment which may be understood by those skilled in the art.

A series of detailed description listed above is merely illustration of the feasible examples of the present invention, and it is not intended to limit the scope of the invention. Equivalent examples or changes without departing from the spirit of the invention are intended to fall into the protection scope of the present invention.

The invention claimed is:

1. A flexible reciprocating linear seedling separating device for a pot seedling transplanter, characterized in that, it comprises a frame, a seedling cup opening and closing device, a flexible linear transmission device, a seedling cup moving device, several seedling cups and a control system;

a flexible linear transmission device is fixed on the frame, the flexible linear transmission device includes a driven shaft, a driven synchronous wheel, a synchronous belt, a first toothed sliding block, a second toothed sliding block, a motor, a coupling, a tension wheel, a driving synchronous wheel, a driving shaft and a tension wheel shaft;

the synchronous belt is installed in the groove of the frame, and both ends of the synchronous belt are respectively connected with the driving synchronous wheel and the driven synchronous wheel;

the driving synchronous wheel is sleeved on the driving shaft, the driving shaft is mounted on one end of the frame through a bearing, and the motor is connected to one end of the driving shaft through the coupling;

the driven synchronous wheel is sleeved on the driven shaft, and the driven shaft is mounted on the other end of the frame through a bearing;

the first toothed sliding block and the second toothed sliding block are in close contact with the synchronous belt through toothed mesh, and are connected with the seedling cup moving device;

the tension wheel is sleeved on the tension wheel shaft and is closely attached to the synchronous belt;

the two ends of the tension wheel shaft are respectively connected with two sides of the frame;

a seedling cup opening and closing device is mounted on the seedling cup moving device, and several seedling cups are fixed on the seedling cup moving device;

the control system is respectively electrically connected with the motor and the seedling cup opening and closing device;

the control system controls the motor to drive flexible linear transmission device to move the seedling cup moving device, so as to drive the seedling cup to receive the pot seedling at a designated position, the control system controls the opening and closing of the seedling cup through a seedling cup opening and closing device to drop the pot seedling onto the designated falling point.

2. The flexible reciprocating linear seedling separating device for a pot seedling transplanter according to claim 1, characterized in that, the other end of the driving shaft passes through, from front to back and in sequence a first circular end cap, a second small retaining ring, a second large retaining ring, a second bearing, the driving synchronous wheel, a first small retaining ring, a first bearing, a first large retaining ring and a third circular end cap;

the second bearing and the first bearing are respectively installed in the slots on the left and right sides of one end of the frame;

a second square gland has a slot at a lower end; the second square gland presses on the first bearing and is fixed on the frame;

the first large retaining ring is placed in the slot;

the first small retaining ring is placed in the slot provided at one end of the driving shaft;

a third square gland has a slot at its lower end;

the third square gland presses on the second bearing and is fixed on the frame;

the second large retaining ring is placed in the slot, and the second small retaining ring is placed in the slot provided at the other end of the driving shaft.

3. The flexible reciprocating linear seedling separating device for a pot seedling transplanter according to claim 2, characterized in that, the bearings at both ends of the driven shaft are respectively installed in the slots on the left and right sides of the other end of the frame;

the lower ends of a first square gland and a fourth square gland respectively have a slot at their lower end and respectively press on bearings on both ends of the driven shaft;

the first square gland and the fourth square gland are fixed on the frame.

4. The flexible reciprocating linear seedling separating device for a pot seedling transplanter according to claim 3, characterized in that, the first square gland, the second square gland, the third square gland and the fourth square gland are respectively fixed on the frame by screws.

5. The flexible reciprocating linear seedling separating device for a seedling transplanter according to claim 1, characterized in that, one end of the tension wheel shaft is connected with the upper end of the first Z type connector through the first double-head stud, and a lower end of the first Z type connector is fixed on one side of the frame by screws;

the other end of the tension wheel shaft is connected with the upper end of the second Z type connector through the second double-head stud, and a lower end of the second Z type connector is fixed on the other side of the frame by screws;

the first double-head stud is located at an upper portion of the first Z type connector, the second double-head stud is located at an upper portion of the second Z type connector, the first and second double-head studs are respectively sleeved with a spring washer and tightened by a nut.

6. The flexible reciprocating linear seedling separating device for a pot seedling transplanter according to claim 1, characterized in that, the seedling cup moving device includes a seedling cup connection frame, a linear sliding block and a linear guide rail;

one end of the seedling cup connection frame has an U-shape with one opening toward the horizontal side, and the other end of it is a vertical plate, the U-shaped end of the seedling cup connection frame is fixed on the first toothed sliding block and the second toothed sliding block that are in toothed mesh with the synchronous belt through bolts;

the linear sliding block slides on the linear guide rail through the inner groove, and the linear guide rail is fixed on the frame through bolts, the middle of the vertical plate end of the seedling cup connection frame is fixed on the linear sliding block by screws.

7. The flexible reciprocating linear seedling separating device for a pot seedling transplanter according to claim 1, characterized in that, the seedling cup includes a seedling cup body, a connecting rod, a first hinge, a second hinge, and a spring;

the seedling cup body is fixed on the seedling cup connection frame by bolts;

a lower end of the first hinge is fixedly connected with the upper end of the leaflet on one side of the opening of the seedling cup body, and a lower end of the second hinge is fixedly connected with the upper end of the leaflet on the other side of the opening of the seedling cup body; the first hinge and the second hinge are respectively rotatablely connected with the seedling cup body;

the two ends of the connecting rod are respectively fixed on one end of the first hinge and the second hinge by bolts, so as to ensure that the opening of the lower end of the seedling cup body can be opened when the seedling cup moves; the two sides of the spring are respectively fixed at the other end of the first hinge and the second hinge, so as to ensure that the opening of the seedling cup body is closed when the seedling cup is still.

8. The flexible reciprocating linear seedling separating device for a pot seedling transplanter according to claim 1, characterized in that, the seedling cup opening and closing device includes a cylinder connector, a cylinder and a brake wire;

the cylinder is fixed on the cylinder connector, and the cylinder connector is fixed on the U-shaped end of the seedling cup connection frame;

one end of the brake wire is fixed on the second hinge;

the other end of the brake wire is fixed on an extension shaft of the cylinder;

the movement of the cylinder pulls and relaxes the brake wire to realize the opening and closing of the seedling cup.

\* \* \* \* \*